J. E. MUHLFELD.
BAFFLE WALL.
APPLICATION FILED OCT. 6, 1916.
1,340,907.
Patented May 25, 1920.
4 SHEETS—SHEET 1.
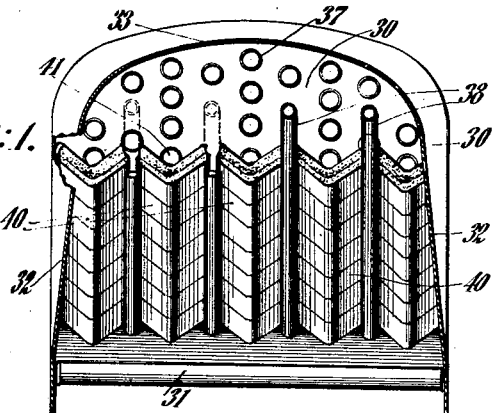
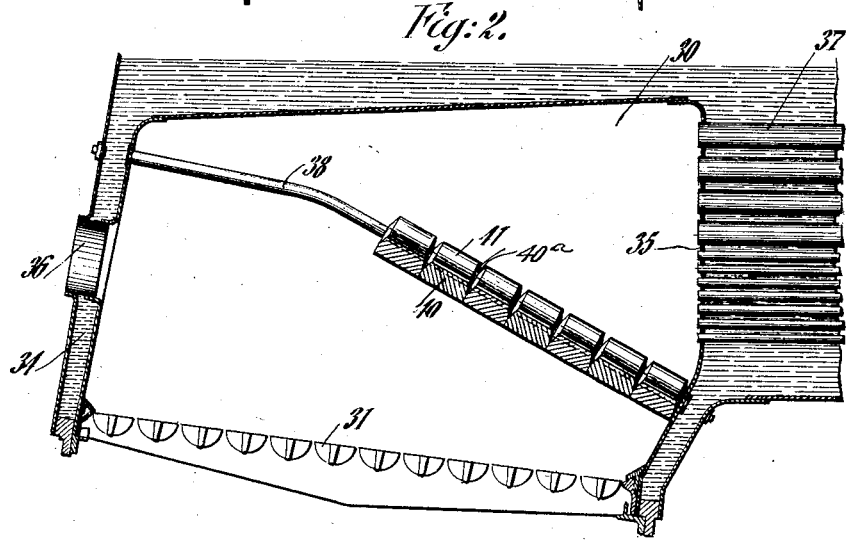
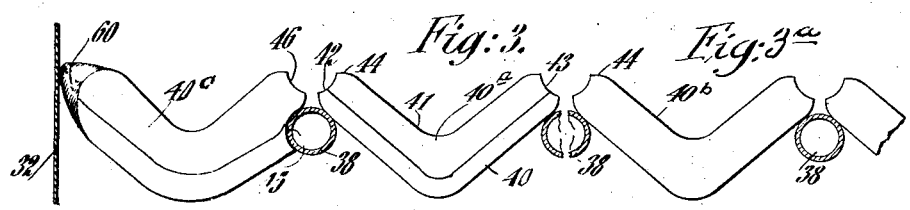
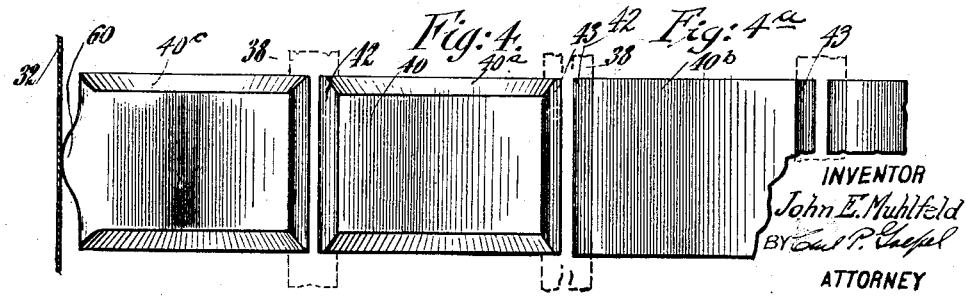
INVENTOR
John E. Muhlfeld
BY
ATTORNEY

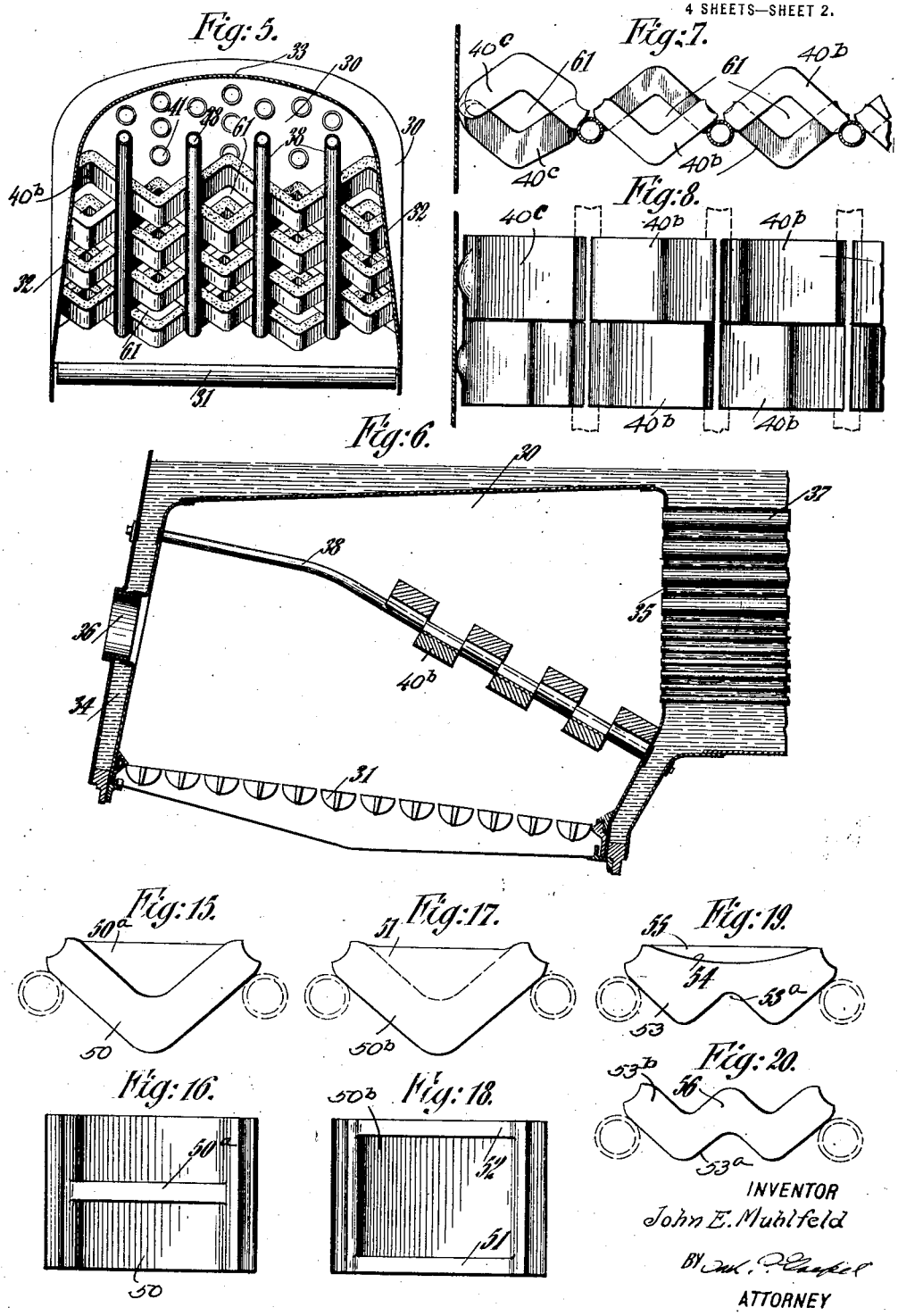

J. E. MUHLFELD.
BAFFLE WALL.
APPLICATION FILED OCT. 6, 1916.
1,340,907.
Patented May 25, 1920.
4 SHEETS—SHEET 3.
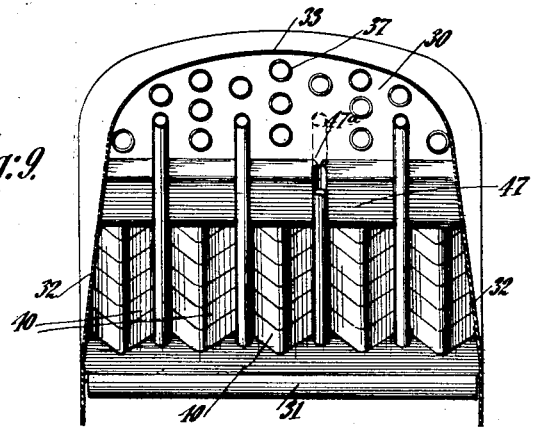
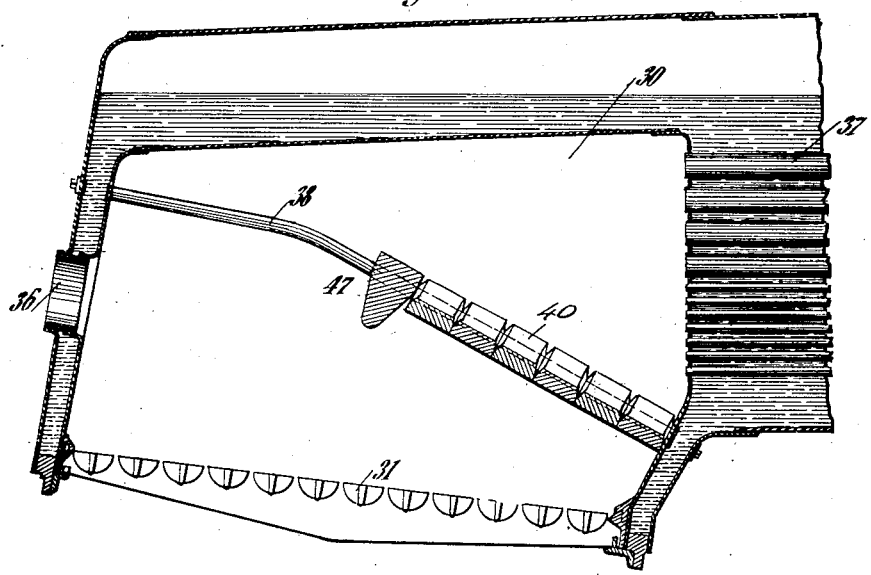
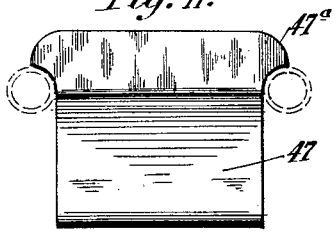
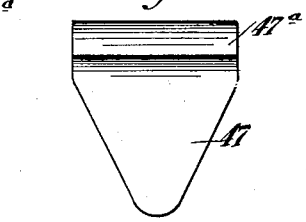
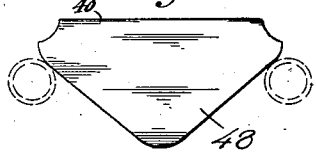
INVENTOR
John E. Muhlfeld
BY Emil P. Cooper
ATTORNEY J. E. MUHLFELD.
BAFFLE WALL.
APPLICATION FILED OCT. 6, 1916.
1,340,907.
Patented May 25, 1920.
4 SHEETS—SHEET 4.
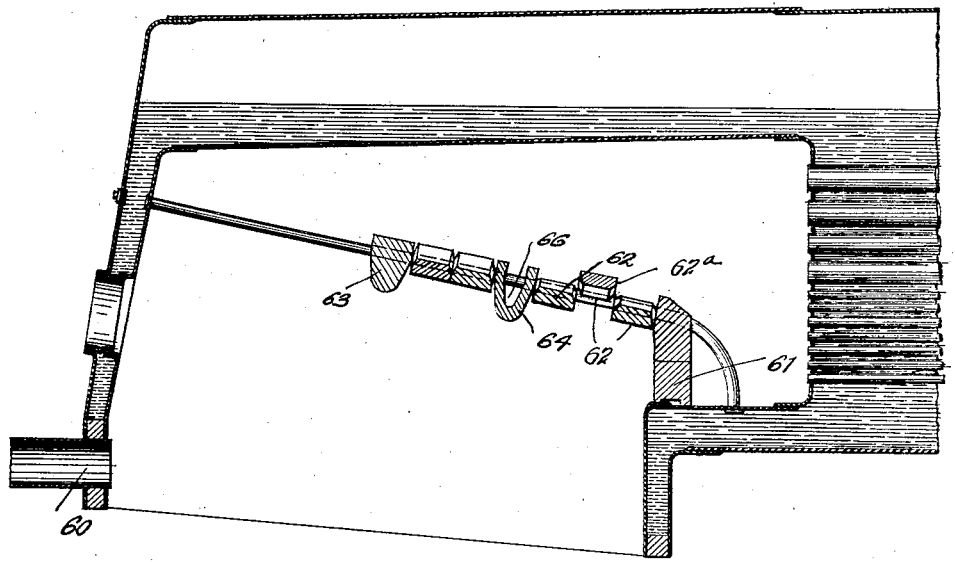
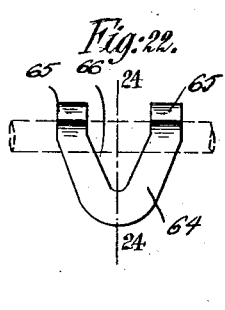 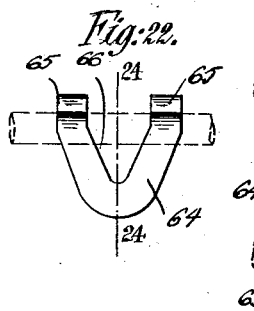 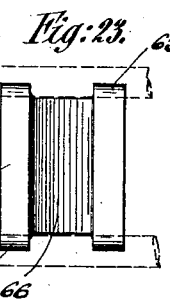 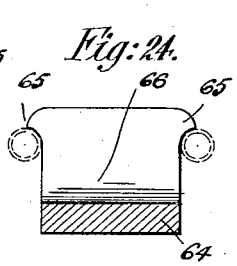
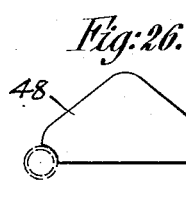 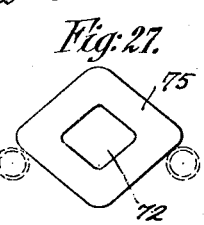 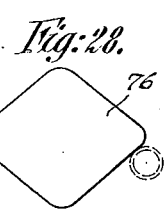
INVENTOR
John E. Muhlfeld
BY
ATTORNEY

UNITED STATES PATENT OFFICE.

JOHN E. MUHLFELD, OF SCARSDALE, NEW YORK.

BAFFLE-WALL.

1,340,907.            Specification of Letters Patent.       Patented May 25, 1920.

Application filed October 6, 1916. Serial No. 124,018.

*To all whom it may concern:*

Be it known that I, JOHN E. MUHLFELD, a citizen of the United States, and resident of Scarsdale, in the county of Westchester, State of New York, have invented certain new and useful Improvements in Baffle-Walls, of which the following is a specification.

The present invention relates to improvements in baffle walls, particularly for the fire boxes of steam locomotives, and bricks therefor. Heretofore it has been well known that in the existing forms of baffle walls, and particularly as used in steam locomotives, the tendency is for the refractory material constituting the brick of the baffle wall to burn or melt, or cut out or waste away rapidly between the exposed supporting water tubes, and legs. It is also known that there has been no disposition of such refractory material as will tend to cause the gaseous and solid products of combustion to flow undeviatingly along and in contact with the water tubes while the cooler portions of the baffle brick rest on the tube, where, because of the continued cooling effect of the circulating water the brick is less affected by the heat, and will not burn or melt, cut out or waste away so rapidly. As a result of these conditions, the melted refractory material, as well as the fused ash, soot and other solid products of combustion gradually flow from the intermediate portions of the brick and collect upon the water tubes and legs, in time almost completely covering them, so that the tubes and legs which properly should be directly exposed to the action of the combustion, become incased in a covering of brick and fused or molten ash, which because of the continual cooling effect of fresh water circulating through the water tubes and legs, has little tendency to melt, and on the other hand would constantly become thicker, thereby causing the water tubes and legs to greatly lose in efficiency, lessening their evaporative capacity, increasing the waste heat, and making the period of advantageous use of the baffle wall comparatively short.

The object of my invention, therefore, is to so dispose the refractory baffle material as to increase the heat radiation area, either on the upper or lower faces, or on both faces, as well as to provide channels along and in which, the products of combustion may travel, and thereby the travel of these gases below the baffle will be mainly diverted adjacent the heat absorbing water exposed tubes and legs, in order that the evaporative capacity of the steam generator will be increased, and so that the gaseous and solid products of combustion will be more quickly cooled after the combustion process has been completed, for the purpose of preventing honey-comb and like deposits from being formed at the water exposed furnace sheets.

A further object of my invention is to so support and dispose the refractory material that the gaseous and solid products of combustion will tend to flow along the cooler surfaces and parts of the baffle brick and of the exposed water tubes and legs, and thereby prolong the life of the refractory material.

Another object of my invention is to so support and suspend the refractory material on the water tubes and sheets that the refractory material will tend to center and retain itself in proper position regardless of the effect of forced draft, or of jarring and vibrations which sometimes with ordinary brick causes them to turn or become displaced. In this connection, in one form of my invention, the brick are supported in pendent relation between adjacent water tubes by disposing the brick at their ends in tangential contact with the tubes. I thus reduce to a minimum the area of tube surface which is covered by the brick, and correspondingly decrease the loss of heat absorbed by the tubes due to conduction through the contacting portions of the brick. Likewise, a maximum surface area of each tube is exposed upon which the flame and products of combustion may impinge.

I also provide an improved correlation and disposition of the heat radiation and absorbing surfaces, for the purpose of promoting combustion, in order that the gaseous and solid products of combustion may be improved and made more effective, and less liable to cause trouble due to their usual and necessary impingement and contact with the heat radiating and heat absorbing surfaces.

With the present invention, it is intended to reduce the tendency of the melted noncombustible refractory material and products of combustion, to incase the water tubes and legs, and to flow to an apex intermediate the water tubes and sheets, thereby increasing and improving the heating effect produced.

Still further objects are to provide means for reversing the brick in such manner as to accomplish the desired result in various ways, to increase the life of the refractory material, and to insure easy and successful manufacture of the refractory material and produce such shapes as can be readily and safely piled and shipped.

With these and other objects in view, my invention is shown in the accompanying drawings, and will be hereinafter more fully described with reference thereto, and finally pointed out in the claims.

In the accompanying drawings:

Figure 1 is a vertical transverse sectional view of a locomotive fire box, showing one form of my invention employed therein as a baffle wall, Fig. 2 is a vertical longitudinal sectional view thereof, Fig. 3 is an enlarged end view of the baffle wall with parts broken away, Fig. 3ᵃ is a similar view showing a slightly modified form of baffle brick, Fig. 4 is a vertical transverse sectional view showing another arrangement of baffle wall produced with my invention, Fig. 4ᵃ is a top view of the form shown in Fig. 4, Fig. 5 is a vertical transverse sectional view showing another arrangement of baffle wall produced with my invention, Fig. 6 is a vertical longitudinal sectional view thereof, Fig. 7 is an end view of the baffle wall, Fig. 8 is a top view thereof, Fig. 9 is a vertical transverse sectional view of a further modification, Fig. 10 is a vertical longitudinal sectional view thereof, Figs. 11 and 12 are respectively front and end views of a modified form of brick employed in this form of my invention, Figs. 13 and 14 are end views of two further modified forms of brick, Figs. 15 and 16 are end and top views of another modified form, Figs. 17 and 18 are similar views of a still further modified form, Figs. 19 and 20 are end views of other modified forms, Fig. 21 is a vertical longitudinal sectional view of a modified form of fire-box for the burning of pulverized or liquid fuel, and embodying a further modified form of baffle wall, Fig. 22 is a side view of the special form of brick employed in the modification shown in Fig. 21, Fig. 23 is a top view thereof, Fig. 24 is a sectional view taken on the line 24—24 of Fig. 22, Fig. 25 is an end view of another form of baffle brick, showing in full lines the convex portion of the brick at the upper side and in dotted lines the convex portion at the under side, Fig. 26 shows in inverted position the form of brick shown in Fig. 13, Fig. 27 shows a brick of diamond shape in cross-section, and hollow, and Fig. 28 shows a similarly shaped solid brick.

Similar reference characters indicate corresponding parts throughout the several figures of the drawings.

Referring to the drawings, and more particularly to Figs. 1 to 4 thereof, the locomotive fire box and combustion chamber 30 is provided with a grate 31, and is double walled, water circulating between the walls, the inner wall comprising the side sheets 32, the crown plate 33 and the front and rear walls 34 and 35, the front wall being provided with an opening 36, through which fuel is fed. Where liquid or pulverized solid fuels are used, no grates are required. A plurality of flues 37 extend from the rear wall through the water in the boiler and through these tubes the heated gases of combustion pass from the fire box and combustion chamber. Tubes 38 connect the front and rear walls, and the water flows therethrough from the rear to the front, the tubes being inclined upwardly. These tubes are preferably four in number, and with the sheets 32 serve to support the baffle wall hereinafter more fully described.

The brick 40 of which the baffle wall is constructed, according to my invention, are formed of refractory non-combustible material and of such form as to provide a depressed or hanging apex, the lowest point of which is beneath the surface of the water tubes 38 when the brick are placed thereon, so that when the bricks are placed at each side of a tube, a channel is formed along that tube, the tube itself forming the base thereof. In other words, each brick is of substantially V-shape form, and is provided with a concave face 41, which, in the arrangement of the bricks as seen in Fig. 1 of the drawings, constitutes a part of the upper surface of the baffle wall. The lower or convex face of the brick is disposed in substantially parallel relation to the upper concave face thereof. It will, however, be understood that the baffle brick may be of many other forms or shapes, several of which will be hereinafter more particularly referred to. In this way a large heat radiating surface is produced both at the upper and lower sides of the baffle wall. The longitudinal edges of each brick are beveled for the greater portion of its thickness as at 40ᵃ so that only a small portion of the adjacent bricks contact, this contacting portion being at the side exposed to combustion. This permits of the easy separation of the brick when it is desired to remove or renew the wall, these bricks, as is well known becoming fused together. In Figs. 3ª and 4ª I have shown a form of brick 40ᵇ which differs from the one described above only by not being beveled at its side edges. It is to be observed that the brick at their ends are supported upon the tubes in tangential contact therewith, and the under faces of the diverging portions of the brick extend in such tangential relation to the tubes to a point below the plane of the lower surfaces of the tubes. By constructing the brick in this manner, they may be said to automatically seat themselves upon the tubes with their diverging portions in pendent relation to the adjacent tubes. It will also be apparent that by providing a single point of tangential support of the brick ends on the tubes, the loss of heat absorbed by the tubes due to conduction through the brick, is reduced to a minimum.

The ends of the bricks are arcuately recessed as at 42 and 43, the radius of the said recess being substantially the same as the radius of the tubes, the axes of the recesses at each end being parallel and at the same distance from each other as the axes of two adjacent tubes. By reason of this construction, the brick may be placed upon the tubes in inverted position for the purpose of rearrangement or to prolong the life of the same, so that after one side face has wasted away due to exposure to the burning fuel, another side or face may be exposed to the burning fuel. One application of the brick in this position is hereinafter more fully pointed out. The upper and lower surfaces of the brick are rounded at their ends as at 44, which serves to increase the exposed portion of the tubes in the inverted position of the brick, and also prevents chipping, etc., due to rough handling.

The bricks 40ᶜ forming the end rows are of different form than those of which the intermediate rows are constructed, being of greater thickness and provided at the tube engaging end with a recess 45 adapted to partially embrace the tube, and above the recess 45 there is provided another recess 46 which permits the engagement of the brick, when inverted, with the pipe. At the opposite or side sheet engaging end this brick is provided with a raised projecting boss 60, the outermost contact point of which is adapted to engage the water legs at a point above the plane of the axes of the pipes. This boss 60 may or may not be used as desired, or two or more such bosses might be used on each brick. These side row bricks, it will be seen have contact with the side sheet at one point only, so that a solid fit is established irrespective of the unparallel relation of the side sheets with the water tubes. Where two or more bosses are used, they are made to fit the particular shape of the fire box.

With the baffle wall formed according to my present invention, greater heating efficiency is obtained and the solid and gaseous products of combustion are directed and concentrated in such manner as to produce the most effective results, namely along the water tubes and legs both by direct contact and radiation. A large heat radiating surface is afforded, both at the upper and lower sides of the baffle wall, increasing the boiler efficiency and reducing the waste heat, and the heat is concentrated upon the water tubes and legs by reason of the channels. The longitudinal joints between adjacent rows of bricks are symmetrically above the respective tubes 38, and between each two adjacent tubes 38, each of the bricks presents a continuous, jointless surface. These tubes remain exposed, as the melted refractory and non-combustible materials flow to the depressed apex of the brick instead of collecting on the heat absorbing water tubes or fire box sheets and clogging said longitudinal joints, which greatly reduces the evaporating capacity and in a short time requires the renewal of the brick. With my improved brick the period of usefulness of the brick is comparatively great, resulting in economy and uniform efficiency during the use of the baffle wall, and the life of the brick is still further increased by reversing. When the bricks constituting the wall structure, are all arranged in the same position with their diverging portions depending below the lower surfaces of the tubes, it will be seen that a plurality of channels are formed, and in the valley of each channel one of the tubes is located. The bottom faces of the diverging portions of the bricks in each row, serve to direct the flame and gases upwardly and to confine the same against transverse expansion in contact with the tubes. At the same time, however, these depending portions of the brick present smooth and continuous surfaces offering no obstruction to the free longitudinal flow of the gases undeviatingly along and in contact with the several water tubes. Thus, there is a substantially uniform distribution of the heat units contained in the ascending products of combustion along the entire length of the water tube.

In Figs. 5 to 8 I have shown a modified arrangement of the brick the individual bricks being of the same form as in Figs. 3ª and 4ª, but alternate bricks of each row being disposed in inverted position. As shown, the transversely adjacent bricks of adjoining rows are also placed with their convex surfaces alternately at the top and at the bottom.

With this construction, openings 61 are provided adjacent each brick, which permits the partial passage of the products of combustion through the baffle wall before reaching the forward end thereof. As occasion demands, the brick may be arranged in various other ways to accomplish the desired combustion, draft, heat distribution and disposal of non-combustible products.

In the form of construction shown in Figs. 9 to 12, I have shown a further modification in which a diverting wall is arranged at the front end of the baffle wall, and which consists of wedge shaped bricks 47 disposed between the tubes and the side sheets. These bricks may also be saw-tooth, circular, oval or other suitable shape. The bricks 47 are provided with shoulders 47$^a$ at the upper ends, the lower surfaces of which are curved to conform to the tubes, and are in this manner hung between the tubes, forming an overhanging wall. As the heated gases and products of combustion reach the forward end of the channels of the baffle wall, they will be downwardly and forwardly directed, before flowing above the wall, as clearly shown in Fig. 10. A more effective heating of the front wall of the fire box is thereby obtained. Such an overhanging wall may also be provided at an intermediate point of the baffle wall. Such a construction is shown with reference to a further modified form hereinafter described, and shown in Fig. 21.

In Figs. 13 to 20 I have shown various modified forms of baffle brick, according to my invention, and it will be understood that further modifications may be resorted to if desired. In the form shown in Fig. 13 the upper surface 48$^a$ of the brick 48 is flat, thereby giving the baffle wall a flat upper surface and a channeled under surface. By reversing the brick, the channels may be eliminated if for any reason this is desired, and an increased heat radiating surface provided at the upper side of the wall.

Fig. 14 illustrates a form in which the apex 49$^a$ of the brick 49 is flattened. This gives a substantially flat form to the lower surface of the baffle wall, with the exception of the channels adjacent the water tubes.

In Figs. 15 and 16 a central flange or web 50$^a$ is provided, which bridges the concavity in the upper side of the brick 50. This serves to strengthen the brick, increases the heat radiating surface and provides a plurality of pockets in the baffle wall when the brick are placed adjacent each other. The form of brick 50$^b$ shown in Figs. 17 and 18 is somewhat similar, the concavity being closed at its ends by flanges 51 and 52, in this way forming the concave surface into a rectangular pocket or recess.

Figs. 19 and 20 illustrate baffle brick 53 and 53$^b$ respectively in which a channel or recess 53$^a$ is provided centrally of the convex side, thereby forming two apexes resembling saw-teeth. The heat radiating surface of the brick is thereby materially increased, and intermediate channels are provided between the water tubes. The concavity 54 provided in the upper side of the brick according to Fig. 19 is substantially of less depth than in the above described forms, and while the same may be plane, it is preferably provided with a flange 55 which serves to reinforce the brick, which might otherwise be weakened at the center by the channel 53.

In Fig. 20 the concavity is provided with a central ridge 56 increasing the thickness of the brick at the central portion, and providing two channels along the upper surface.

In Fig. 21 I have shown a form of my invention for use with pulverized liquid or solid fuel. The fuel and air are fed through a passage 60, and in this form a grate is dispensed with. A vertical wall 61 is provided toward the rear of the fire box and the baffle wall extends forwardly in inclined direction therefrom. One section 62 of this baffle wall has its bricks so arranged that the middle row of bricks is inverted; that is to say, that surface of the row 62$^a$ which forms the top surface in that row is the same surface which in the other rows forms the bottom surfaces of the bricks. An overhanging diverting wall 63, similar to that shown in Figs. 9 and 10, is provided at the forward end of the baffle wall, and an intermediate diverting wall 64 is also provided in which, however, the individual brick are somewhat modified. These are wedge shaped and provided with shoulders 65 for supporting them on the tubes, and are provided in their upper side with V-shaped recesses 66. This makes a lighter, less expensive brick, and one in which a large heat radiating surface is exposed.

The baffle shown in this form of my invention is particularly effective in the burning of pulverized fuel. The path of the fuel is caused to diverge at the walls 63 and 64 and a portion of the fuel passes through the part 62 of the baffle wall. This action causes a retardation of the flow of the fuel resulting in a complete and efficient combustion of the fuel and the production of a very intense and effective heat.

In Fig. 25 I have shown a form of brick set on two water tubes, so that the convex surface is at the upper side. The two faces 67 and 68 forming the upper convex surface meet in a point 69, and the tube engaging surfaces 70 and 71 are flat. The lower surface is also flat, but may if desired be recessed. I have shown in dotted lines the manner in which this form may be set in inverted position.

Fig. 26 illustrates the inverted position of the form of brick shown in Fig. 13.

In Fig. 27 I have shown a modification in which the brick 75 is diamond shaped in cross-section, and made hollow by a central opening 72. In Fig. 28 the same shape of brick 76 is formed solid. These bricks, it will be seen, form an apex, both above and below the water tubes. When one side has become unfit for further use by wasting away, due to the action of the heat and products of combustion, the same may be readily inverted. This form of brick may also be made square in cross-section, instead of diamond shaped.

All of these forms, it will be noted, provide a large heat radiating surface, and channels along the water tubes. When inverted the new surface is the same as the original surface.

It will be understood that all of these modified forms of brick may be beveled or otherwise reduced at the ends, as in the first form of construction, so as to provide a relatively small contacting surface between the bricks.

I have illustrated and described preferred and satisfactory forms of my invention, but it is obvious that changes may be made therein within the spirit and scope thereof as defined in the appended claims.

I claim:

1. In a furnace, water tubes, and baffle bricks of like construction supported on said tubes and each provided with a convex surface on one side and a concave surface on the other side, each of said bricks adapted to be carried by the water tubes either with the concave surface at the top or with the convex surface at the top, the bricks which are located between the same two tubes having their convex surfaces alternately at the top and at the bottom and forming draft openings through the baffle wall at the junction of the adjacent bricks.

2. In a furnace arch, spaced water tubes, and an arch wall consisting of baffle units supported on said tubes, said units being so constructed that when they are all arranged in one position a wall of unbroken continuity is formed and when certain of the units are arranged in another position openings are afforded in said wall.

3. In a furnace, water tubes, and baffle bricks whose ends are supported on said tubes, alternate bricks having concave upper surfaces and convex lower surfaces extending below the tubes at the central portions of the bricks, while the intervening bricks have convex upper surfaces and concave lower surfaces forming openings in conjunction with the concave upper surfaces of the adjacent bricks.

4. In a furnace arch, spaced water tubes, and an arch wall consisting of adjustable baffle units supported on said tubes, said units each having angularly related portions, said angular portions of the units being located in a common plane and in abutting contact when the units are all arranged in the same position on said tubes, and extending downwardly below the tubes in one position of said units and above the tubes in the other position of said units.

5. In a furnace, water tubes, and baffle bricks supported on said tubes, alternate bricks of the same row, between the same two tubes, having convex lower surfaces and concave upper surfaces, while the intervening bricks have convex upper surfaces and concave lower surfaces forming openings in conjunction with the concave upper surfaces of the adjacent bricks of the same row, while transversely adjacent bricks of different rows have their convex surfaces arranged alternately at the top and at the bottom.

6. In a furnace arch, spaced water tubes, and an arch wall consisting of reversible baffle units supported on said tubes, said units each having angularly related portions, said angular portions of the units being located in a common plane and in abutting contact when the units are all arranged in the same position on said tubes, and extending downwardly below the tubes in one position of said units and above the tubes in the other position of said units, the alternate units being adapted for arrangement in reversed position on the tubes whereby the angular portions of adjacent units will afford a plurality of openings in the wall.

7. In a furnace provided with water tubes and legs, baffle bricks each provided with a convex surface on one side and with a concave surface on the other side, said bricks being supported on said water tubes and legs, alternate bricks being placed on said tubes inverted, with the convex surfaces at the bottom, while the intervening bricks are placed on the tubes in an upright position, with the concave surfaces at the bottom, in such a way as to form openings or passages between the concave upper surfaces of the inverted bricks and the concave lower surfaces of the adjacent upright bricks.

8. In a furnace arch, spaced water tubes, and reversible baffle units having diverging portions, said units being adjustable upon the water tubes and supported thereby with their intermediate portions projecting either below the plane of said tubes or above the same according to the position in which the said units may be arranged.

9. In a furnace arch spaced water conduits, and baffle bricks adapted to be arranged upon and between adjacent conduits in pendant relation thereto and between the side walls of the furnace and the adjacent conduits, each of said bricks having diverging heat deflecting surfaces, said surfaces at the ends of the brick having a relatively limited area of supporting contact upon the upper sides of the respective conduits with the surfaces extending in tangential relation to the conduits and to a point below the plane of the lower surfaces of the conduits.

10. In a furnace, longitudinal supports, and saddle-shaped bricks of like construction resting on said supports, the bricks between the same supports forming a row, the bricks of the same row having the central portion of the saddle shape alternately at the top and at the bottom to form openings at the meeting ends of the bricks of the same row.

11. As an improved article of manufacture, a structural unit for furnace arches having parts projecting in angular relation to each other from the center of the unit and adapted for engagement at their ends with spaced supports and with the body of the unit projecting either above or below the plane of the supports.

12. In a furnace, longitudinal supports, and bricks of saddle-shaped form adapted to rest on said supports, either with the apex of the saddle-shape above the adjacent portions of the supports, or with said apex below such adjacent support portions, whereby in either position the bricks in adjacent rows combine to form channels with the supports in the valleys of said channels.

13. In a furnace, longitudinal supports, and bricks of saddle-shaped form adjustable upon said supports with the apex of the one brick directed upwardly, and with the apex of the adjacent brick in the same row directed downwardly, the thickness of each brick being less than one-half the distance between the apexes of adjacent bricks, whereby an opening will be formed between adjacent bricks of the same row.

14. In a furnace arch, spaced water tubes, and baffle units arranged between and supported by said tubes, said units being reversible to present one of two opposite faces to the combustion chamber of the furnace, each unit being constructed to provide a portion extending above or below the water tubes according to the position in which the said units may be arranged.

15. In a furnace arch, spaced water tubes, and baffle units arranged between and supported by said tubes, said units being reversible to present one of two opposite faces to the combustion chamber of the furnace, and in either position said units having bearing contact with the tubes only at points above the axial centers thereof, each unit being constructed to provide a portion extending above or below the water tubes according to the position in which said units may be arranged.

16. As an improved article of manufacture, a structural unit for furnace arches having diverging parts extending at substantially right angles to each other from the center of the unit and adapted to rest at their ends upon spaced supports with the body of the unit extending below the supports, the ends of said diverging parts being also formed with means to engage the supports when said unit is arranged in an inverted position with its body portion extending above the supports.

17. In a furnace, spaced water tubes, and a refractory arch consisting of baffle bricks arranged in longitudinal rows between said tubes, each brick having divergently related imperforate portions positioned with their free ends in tangentially contacting engagement with the upper sides of adjacent tubes to support the brick with its diverging portions depending below the lower surfaces of the tubes and in abutting contact at their side edges with the depending diverging portions of the adjacent baffle bricks in the row to form a continuous heat radiator and deflector extending longitudinally of and centrally between the adjacent tubes, the opposed side faces of the depending portions of the brick in adjacent rows converging upwardly toward the same tube and constituting the side walls of a gas and flame receiving channel within which the supporting tube is located, and maintaining the longitudinal flow of the gases undeviatingly in said channels along and in contact with the tubes.

18. In a furnace, spaced water conduits, and an arch consisting of a plurality of mating baffle bricks transversely arranged between adjacent water conduits and each of a width less than the distance between the adjacent conduits, each brick having divergently related portions adapted to be positioned in tangentially contacting engagement at their free ends with the conduits to support the brick with its medial portion in a pendant position between the adjacent conduits.

In testimony that I claim the foregoing as my invention, I have signed my name in presence of two subscribing witnesses.

JOHN E. MUHLFELD.

Witnesses:
D. LEWIS MATTERN,
M. MOE WEINBERG.